United States Patent [19]
Burk

[11] 3,888,709
[45] June 10, 1975

[54] CABLE FILLING COMPOUNDS
[75] Inventor: William R. Burk, Lake Jackson, Tex.
[73] Assignee: The Dow Chemical Company, Midland, Mich.
[22] Filed: May 10, 1974
[21] Appl. No.: 468,776

[52] U.S. Cl............. 156/48; 174/110 PM; 174/116; 252/63; 260/897 A
[51] Int. Cl. .......................................... H01b 13/00
[58] Field of Search.......... 156/47, 48; 174/110 PM, 174/110 SA, 116, 23 C, 23 P, 23 R, 25 C; 252/63, 64; 260/897 R, 897 A

[56] References Cited
UNITED STATES PATENTS
3,125,548 3/1964 Anderson.................... 260/897 A X
3,176,052 3/1965 Peticolas........................ 260/897 A
3,375,303 3/1968 Joyce .............................. 260/897 R
3,645,929 2/1972 Normanton et al......... 260/897 A X Primary Examiner—Charles E. Van Horn
Assistant Examiner—David A. Simmons
Attorney, Agent, or Firm—Lester J. Dankert

[57] ABSTRACT

Cable filling compositions and cables, especially telephone cables, filled therewith where the compositions are melt-blended mixtures of low density polyethylene constituents A in major proportion and B in minor proportion, A being relatively low molecular weight and B being relatively high molecular weight, the mixtures at room temperature being soft, semi-solid grease-like materials. Cables filled with such composition resist dripping under standard test up to about 80°C.

7 Claims, 1 Drawing Figure

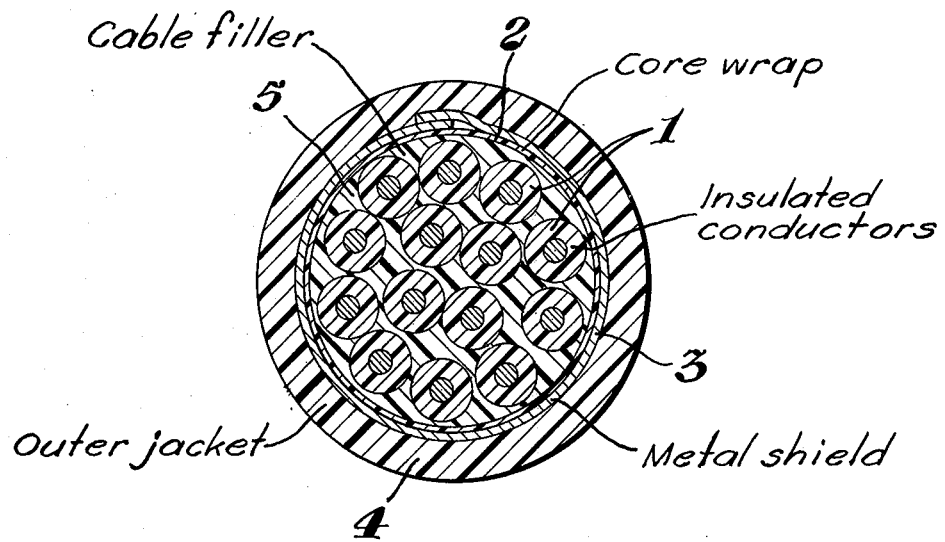

CABLE FILLING COMPOUNDS

BACKGROUND OF THE INVENTION

The invention relates to filling compositions for electrical cables and to cables, particularly telecommunication cables, filled with such compositions.

In the art of designing and constructing electrical cables, especially telecommunication cables such as telephone cables, it is known to assemble insulated conductors in a core surrounded by wrapping, shield and jacket components and to fill or flood the otherwise empty interstitial spaces within the core and elsewhere within the cable with an insulating oil, grease or plastic composition known generically as cable filling compound or filler. The principal purpose of the cable filling compound is to safeguard the cable, in the event the cable jacket and shield are penetrated, by preventing or minimizing the entry of water into the interior of the cable and the deleterious consequences of flow of water liquid and vapor longitudinally within the cable from the point of penetration.

Among the general requirements for a suitable cable filling compound are certain physical, chemical and electrical properties. It should have low dielectric constant and high chemical stability under conditions of cable use. It should not soften or weaken the plastic insulation or jacket of the cable. It should be capable of fluid flow into the cable spaces during manufacture but resist flowing out of the cable ends or settling from relatively higher elevated portions of the cable into portions at lower levels.

Petrolatum (petroleum jelly) has been used for cable filling although it is not entirely satisfactory. Its dielectric constant is too high and it tends to swell and weaken the polyethylene insulation and jackets of cables using such materials. Moreover, it tends to drain out of cables, especially at higher temperature.

It has been proposed to mix with petrolatum a high molecular weight thermoplastic polymer such as polyethylene; such a cable-filling composition is described in U.S. Pat. No. 3,607,487 which also describes a typical method and means for filling communications cables and illustrates the state of the art. The addition of polymer such as polyethylene to petrolatum benefits the resistance to flow property of the filler in the cable, but requires that the composition be heated above the softening point of the polymer so that the mixture is handled hot at the time of introducing it into the cable structure. A similar system for filling cables and meltable compositions therefor solidifiable by cooling are shown in Canadian Pat. No. 833,446. In addition to the obvious handling hazards presented by hot, molten plastic compositions, the heat of such materials endangers the insulation and the components of the cable structure and, upon eventual cooling, shrinkage occurs which tends to form voids in the cable.

A heat-resistant petrolatum-containing cable filling composition which is pumpable at ambient temperature is shown in U.S. Pat. No. 3,683,104. However, the special additives required are not always readily available. Moreover, although the composition is superior to petrolatum alone, there is still a need for alternate, readily available compositions. As mentioned in U.S. Pat. No. 3,683,104, low molecular weight polyethylene grease resembling petroleum jelly in consistency has been proposed for cable filling.

It is an object of this invention to provide improved cable-filling compositions which have grease-like consistency and can be pumped to cable-filling means but which resist flowing or draining out of the finished cable even at elevated test temperature. A related object is to provide cables, especially telecommunication cables, filled with such compositions. A related object is to provide such cable filling compositions which can be pumped and disposed within cables at ambient temperature, e.g., at normal room temperature. Other objects and advantages of the invention are apparent in the description that follows.

SUMMARY OF THE INVENTION

The objects of the invention are attained in cable filling compositions and cables, especially telephone cables, filled therewith, which are blends of low density polyethylenes composed of a major proportion of relatively low molecular weight polyethylene constituent (A) and a minor proportion of relatively high molecular weight polyethylene constituent (B), both as more fully described hereinafter. Both constituents are low density, free-radical initiated, polymers of ethylene. Constituent A has weight average molecular weight from about 800 to about 3,000, preferably from about 1,500 to about 2,200. Constituent B has weight average molecular weight from about 70,000 to about 300,000, preferably from about 100,000 to about 150,000. Constituents A and B are also characterized by their flow rates under standard conditions as hereinafter specified.

The cable-filling composition as prepared by thoroughly mixing together constituents A and B at a temperature above the melting point of the mixture, usually above about 105°C and preferably from about 135°C to about 200°C, and cooling the resulting melt with stirring to below about 90°C, preferably below about 75°C, to form the grease-like product. Thereafter, the grease can be allowed to cool to ambient room temperature and used for cable filling in conventional manner and means.

The resulting blends of constituents A and B are characterized as soft, semi-solid, grease-like materials at normal room temperature.

Typical communications cables filled with this composition pass standard drainage tests up to about 80°C and are flexible at low temperatures, e.g., down to −17.8°C (0°F). The filling composition shows no deleterious effects on plastic materials such as polyethylene commonly used in cables for insulation and jacketing and shows no tendency to exude oily material.

DESCRIPTION OF THE DRAWING

The single FIGURE of the drawing is a schematic representation in cross-section of a typical multi-paired communications cable with insulated conductors in a core with a surrounding core wrap, shield and jacket, the interstitial spaces of which cable are filled with the cable-filling composition.

DETAILED DESCRIPTION AND EMBODIMENTS

As indicated hereinbefore, the cable-filling compositions of this invention are blends of low density, free-radical initiated, polyethylenes composed of a major proportion of relatively low molecular weight polyethylene constituent A and a minor proportion of relatively high molecular weight polyethylene constituent B. Constituent A is usually from about 80 to about 99, preferably from about 89 to about 95, percent by weight, and constituent B is correspondingly from about 1 to about 20, preferably from about 5 to about 11, percent by weight based on the combined weights of constituents A and B. The molecular weights (MW) of the constituents A and B are weight average molecular weights measured by gel permeation chromatography. Constituent A has MW from about 800 to about 3,000, preferably from about 1,500 to about 2,200. Constituent B has MW from about 70,000 to about 300,000, preferably from about 100,000 to about 150,000.

The constituents are further characterized by their melt flow properties, particularly by measuring their rates of extrusion through a die of the extrusion plastometer in apparatus and by means described in ASTM Standard Method Designation D–1238-70.

The melt flow rate of constituent B can be measured under Condition E of that method, i.e., at 190°C under total load of 2,160 g using the standard die orifice of 0.0825 ± 0.0002 inch (2.0955 ± 0.0051 mm). Under these conditions the "Melt Index," i.e., the melt flow rate value, of constituent B is from about 0.2 to about 250 decigrams per minute (dg/min), preferably from about 20 to about 50 dg/min.

The melt flow rate of constituent A under Condition E of ASTM D–1238 is too high to be conveniently measured, so modification must be made. The general apparatus and procedure of ASTM Designation 1238-70 are used, but the test is run at 50°C with 2,160 g total load on the plastometer piston and using a die having an orifice opening of 0.0200 ± 0.0002 inch (0.508 ± 0.0051 mm) in place of the standard orifice die. By the so-modified test, the melt flow rate value of constituent A is from about 5 to about 140, preferably from about 25 to about 35, dg/min.

It will be understood that each of "constituent A" and "constituent B" can be composed of two or more of such materials provided that each component of such constituent has properties as specified herein for the respective constituent A or B and that the composite of components, if plural, making up the particular constituent complies with the description of that constituent.

The low density polyethylene constituents required in the cable filling composition of this invention are individually known kinds of materials made in known manner by polymerization of ethylene under high pressure and temperature in the presence of free-radical initiator such as molecular oxygen, organo per-oxygen compounds or organo-azo compounds. By "low density polyethylene" is meant a polymer of ethylene made by such high pressure, high temperature process with free-radical initiation of polymerization. The density of such polymers is usually in the range from about 0.85 to about 0.93 g/cc at 25°C. By "polyethylene" it is meant to include polymers of ethylene obtained by polymerization of ethylene alone or of ethylene together with minor amounts of lower alkene, especially propylene and butene-1, or of ethylene together with minor amounts of lower alkanes as telogen, such as ethane, propane or n-butane. The addition of lower alkene or lower alkane is a known expedient to decrease the molecular weight of the ethylene polymer product and is usually employed in making constituents A and B.

The blending of low density polyethylene constituents A and B to form the cable filling composition is carried out by intimately mixing the constituents in desired proportions, heating the mixture to melt the constituent B and to reduce the viscosity of the mixture, and stirring it to blend the materials together while melted. The melt blending temperature is above about 105°C, preferably from about 135° to about 200°C, but below the temperature of decomposition or objectionable fuming of the polymer mixture.

After thorough blending of the constituents, the melt blended composition is cooled as rapidly as possible with continued stirring to a temperature below about 90°C, preferably below about 75°C, thereby forming a grease-like product. Thereafter, the product can be allowed to cool, e.g., from about 75°C, to ambient room temperature without further stirring. It is usually convenient to draw off the grease from the mixing apparatus to storage containers at warm temperature, e.g., 50°C. The operations can be carried out in batches or in continuous manner as would be apparent to those skilled in the art.

It is customary to include in the composition of starting constituents A and B small amounts of antioxidants and stabilizers such as 2,6-di-tert-butyl-4-methylphenol or 4,4'-thiobis(2-tert-butyl-5-methyl-phenol). Further amounts of such agents can also be added to the present blend compositions. Where needed or desired, other kinds of additaments such as finely divided silica can be incorporated in the filler compound as known in the cable filling art. There can also be added to the present blend composition hollow, synthetic thermoplastic particles, as described in U.S. Pat. No. 3,683,104, having generally spherical configuration and diameters in the range from about 0.5 to about 200 microns. When used, such particles are dispersed in the present cable filler composition in proportions of up to about 10 parts per 100 parts of the polyethylene blend, by weight. Additaments can be incorporated into the polyethylene blend anytime prior to use as cable filler, but are most conveniently admixed when the blend of polyethylenes is being stirred as a melt before congealing to its grease-like consistency.

The resulting grease-like composition has physical properties dependent upon the kind and proportion of specific constituents blended together. In general, the melt flow property of the blended composition, tested by the modified ASTM procedure D–1238 as previously described herein using 50°C, 2,160 g total load and 0.0200 inch (0.508 mm) orifice, is in the range from about 0.1 to about 25, preferably from about 0.5 to about 10, most preferably from about 1 to about 5, dg/min.

The cable-filling composition of this invention can be used to fill cables such as communication cables, e.g., telephone cables, in conventional manner, using either hot filling or cold filling techniques. One such cable-filling procedure is described in the aforementioned U.S. Pat. No. 3,607,487. Another procedure, particularly adapted for use of the present semi-solid soft grease-like composition is shown in U.S. Pat. No. 3,801,359; in such process the composition can be used at ambient room temperatures or in warm condition coming from incomplete cooling of the melt or in re-warmed condition. As is known to the cable artisan, in the making of multi-pair communication cables, a number of individually insulated twisted conductor pairs are brought together in a forming zone to form a bundle which will become the core of the cable. The core bundle may be composed of several sub-bundles, each held together with a spiral wound thread. In "filled" cables, the conductor bundle is passed through a stuffing box or impregnator wherein the filler compound is forced into the bundle, displacing the air and filling the interstitial spaces between the conductor and other mechanical elements of the bundle with the filling composition. In some instances, the forming zone and the filling zone are in effect combined so that the filler is forced around and among the twisted conductor pairs as they are brought together to form a core bundle containing filler compound. In either case, the so-filled bundle then passes to subsequent operations of the cable manufacturing line to complete the cable construction, such as a zone where plastic film is wrapped or folded about the conductor bundle, a zone where a tape of metal foil such as aluminum or copper is folded longitudinally or wound helically about the core to provide a mechanical and electrical shield, and a zone where a crosshead extruder provides the cable with a seamless extruder plastic outer jacket. If desired, facilities can be provided on the cable line to apply further amounts of filler compound, e.g., over the plastic wrap before or together with the metal shield, or over the metal shield before the plastic outer jacket.

A typical such filled cable is portrayed in the drawing wherein a cable is shown in section. The drawing sketch illustrates the invention, but is not to scale and many variations thereof will be apparent to the cable artisan in the light of this description. A plurality of insulated conductors 1 are arranged in a generally cylindrical bundle surrounded by a core wrap 2 of tough plastic film and a metal shield 3 shown as a longitudinally folded tape with overlapped seam. A plastic outer jacket 4 surrounds the metal shield. A cable filler 5 composed of the composition of this invention is disposed in the interstices between the insulated conductors 1 within the core wrap 2. The conductors 1 are generally of copper covered with polyethylene or other known insulation. Core wrap 2 is usually poly(ethylene terephthalate) or polypropylene film. Shield 3 is usually of aluminum or copper, or a plurality of shields can be used such as aluminum or copper next to the core wrap and a steel tape folded thereover. The outer jacket may be composed of any suitable cable jacketing composition such as, for example, polyethylene, polymers of ethylene, polypropylene or chlorinated polyethylene, usually compounded with carbon black.

The shield 3 is advantageously formed of aluminum having an adhesive coating on at least the outer surface when placed over the core wrap for the purpose of providing a sealing bond in the lap seam of the shield and of bonding the shield to the outer plastic jacket. Suitable exemplary adhesives include random and graft copolymers of ethylene and $\alpha,\beta$-ethylenically unsaturated carboxylic acids such as acrylic acid and methacrylic acid and such copolymers which also includes esters of such acids, partial salts of such acids (ionomers), vinyl acetate, and the like.

The filling compositions of this invention can also be used to fill electrical devices other than cable cores, for example, splice boxes, terminal boxes, junction boxes and like devices where it is desired to exclude water and/or to assist holding component parts in spaced relationship.

The following examples further illustrate the invention but are not to be taken as limiting its scope.

Example 1

A mixture is composed as follows:
92.86 parts by weight polyethylene A
6.99 parts by weight polyethylene B
0.15 part by weight 4,4'-thio-bis-(2-tert-butyl-5-methylphenol)

Polyethylene A is a low molecular weight polymer product of free-radical initiated polymerization of ethylene in the presence of propylene and has melt flow rate of about 30 dg/min at 50°C through the extrusion plastometer of ASTM D-1238-70 when modified with 0.0200 inch die orifice using 2,160 g total load. Polyethylene B is low density (0.915 g/cc) free-radical induced polymer of ethylene which has melt flow rate (Melt Index) of about 50 dg/min by ASTM D-1238-70 Condition E. Starting polyethylene B contains about 1,500 ppm by weight of 2,6-di-tert-butyl-4-methylphenol.

The mixture is heated with stirring to a temperature between 150° and 200°C until all of polyethylene B is melted and well blended with polyethylene A. Cooling is then applied with continued stirring as the blend temperature is quickly lowered to about 50°C, forming a soft, semi-solid grease-like product.

A sample of the resulting blend product has melt flow rate of about 1.9 dg/min through the extrusion plastometer of ASTM D-1238-70 modified with 0.0200 inch die orifice, at 50°C with 2,160 g total load. Other properties are as follows:

| Property | Method | Value |
| --- | --- | --- |
| Viscosity at 135°C | Brookfield* | 135 cp |
| Visc., kinematic, 135°C | ASTM D 445 | 225 cs |
| Melting point | ASTM D 127 | 90°C |
| Density at 23°C | | 0.85 g/cc |
| at 135°C | | 0.73 g/cc |
| Dielectric Constant, $10^5$Hz | ASTM D 150 | 2.2 |
| Dissipation Factor, $10^5$Hz | ASTM D 150 | 0.0005 |

*Model RV using No. 7 spindle at 100 rpm.

The composition just described is used to fill a multi-paired twisted conductor communication cable, pumping the composition at ambient room temperature to a stuffing box as the conductor pairs are being formed into a core structure and forwarded to cable finishing operations for fabrication of aluminum shield and plastic outer jacket in conventional fashion.

Examination of a sample piece of the resulting cable shows no swelling or other indication of adverse effect of the filler compound on the conductor insulation or plastic jacket.

12-inch (30.48-cm) lengths of the resulting cable are subjected to a drip test. From one end of the piece, the outer plastic jacket is removed to a length of 5 inches (12.7 cm). The exposed metal shield and core wrap are removed to 3 inches (7.62 cm) from the end. The twisted pairs of conductors are separated and slightly flared apart. The cable lengths are hung vertically, flared conductors end down, in a circulating air oven maintained at 150°F (65.5°C). After 24 hours in such state and condition, there is no drip of filler compound from the cable or evidence of flow of such compound within the cable. Repeat of the test at oven temperature of 176°F (80°C) shows no evidence of drip or flow.

Other test pieces of the cable are conditioned at 0°F (−17.8°C), tested by bending, and found to be acceptably flexible.

Example 2

A mixture is prepared similar to that described in Example 1 from the same kinds of ingredients, except as to the proportions thereof, as follows:

89.86 parts by weight polyethylene A
9.99 parts by weight polyethylene B
0.15 part by weight 4,4'-thio-bis-(2-tert-butyl-5-methylphenol)

The mixture is heated, melted, stirred and quickly cooled as described in Example 1. The resulting composition has melt flow rate of about 1.4 dg/min by ASTM D–1238-70 modified with 0.0200 inch orifice die, at 50°C and 2,160 g total load. A cable is filled therewith in the manner described in Example 1 except that the composition is preheated and the cable is filled hot, with substantially similar results, i.e., no deleterious effects on the cable and no drip or flow from the cable end by standard test up to temperature of about 80°C (176°F).

Example 3

In a manner similar to that described in Example 1, a cable filling composition is prepared from a mixture of these constituents:

94.86 parts by weight polyethylene AA
4.99 parts by weight polyethylene B
0.15 part by weight 4,4'-thiobis-(2-tert-butyl-5-methylphenol).

Polyethylene AA is a low molecular weight polymer product of free-radical initiated polymerization of ethylene in the presence of propylene, similar to polyethylene A of Example 1, and has melt flow rate of about 35 g/min at 50°C through the extrusion plastometer of ASTM D–1238-70 modified with 0.0200 inch die orifice using 2,160 g total load. Polyethylene B is another portion of the same polyethylene B used in Example 1.

The mixture is heated, melted, stirred and quickly cooled as described in Example 1. Cables are filled therewith in the manner described in Example 1 and otherwise well known in the art, with substantially the same results, i.e., no adverse effects on the cable insulation, plastic jacket or other components, and no drip or flow of filler compound from the cable end by standard drip test up to temperature of about 80°C (176°F).

It will be evident to the skilled artisan that many variations and modifications of the invention can be made without departing from its spirit and scope.

What is claimed is:

1. A filling composition for electrical cables and devices, which composition comprises a major proportion of low density polyethylene constituent A and a minor proportion of low density polyethylene constituent B, which constituent A has melt flow rate value from about 5 to about 140 dg/min when measured by ASTM D–1238-70 at 50°C and 2,160 g total load using 0.0200 inch die orifice and which constituent B has melt flow rate value from about 0.2 to about 250 dg/min when measured by ASTM D–1238-70 at 190°C and 2,160 g total load using 0.0825 inch die orifice, the composition being a melt blended mixture of the constituents A and B and having melt flow rate value from about 0.1 to about 25 dg/min when measured by ASTM D–1238-70 at 50°C and 2,160 g total load using 0.0200 inch die orifice.

2. The filling composition of claim 1 wherein constituent A has melt flow rate as defined therefor from about 25 to about 35 dg/min, constituent B has melt flow rate as defined therefor from about 20 to about 50 dg/min, there are present in the filler composition, based on the combined weights of the constituents A and B, from about 80 to about 99 percent of constituent A and correspondingly from about 1 to about 20 percent of constituent B, and the melt blended mixture of constituents A and B has melt flow rate as defined therefor from about 0.5 to about 10 dg/min.

3. The filling composition of claim 2 wherein there are present in the composition, based on the combined weights of the constituents A and B, from about 89 to about 95 percent of constituent A and correspondingly from about 5 to about 11 percent of constituent B, and the melt blended mixture of constituents A and B has melt flow rate as defined therefor from about 1 to about 5 dg/min.

4. In a telecommunication cable comprising a plurality of insulated electrical conductors arranged in a core and a core wrap defining interstices within the core, the improvement wherein there is disposed within the said interstices a filler composition which comprises a major proportion of low density polyethylene constituent A and a minor proportion of low density polyethylene constituent B, which constituent A has melt flow rate value from about 5 to about 140 dg/min when measured by ASTM D–1238-70 at 50°C and 2,160 g total load using 0.0200 inch die orifice and which constituent B has melt flow rate value from about 0.2 to about 250 dg/min when measured by ASTM D–1238-70 at 190°C and 2,160 g total load using 0.0825 inch die orifice, the composition being a melt blended mixture of the constituents A and B and having melt flow rate value from about 0.1 to about 25 dg/min when measured by ASTM D–1238-70 at 50° C and 2,160 g total load using 0.0200 inch die orifice.

5. In a cable according to claim 4, the improvement wherein constituent A has melt flow rate as defined therefor from about 25 to about 35 dg/min, constituent B has melt flow rate as defined therefor from about 20 to about 50 dg/min, there are present in the filler composition, based on the combined weights of the constituents A and B, from about 80 to about 99 percent of constituent A and correspondingly from about 1 to about 20 percent of constituent B, and the melt blended mixture of constituents A and B has melt flow rate as defined therefor from about 0.5 to about 10 dg/min.

6. In a cable according to claim 5, the improvement wherein there are present in the filler composition, based on the combined weights of the constituents A and B, from about 89 to about 95 percent of constituent A and correspondingly from about 5 to about 11 percent of constituent B, and the melt blended mixture of constituents A and B has melt flow rate as defined therefor from about 1 to about 5 dg/min.

7. In a method of making filled communications cables comprising a bundle of insulated electrical conductors in a core, a filler compound between the insulated conductors, a core wrap, and an outer jacket, by arranging a plurality of insulated electrical conductors to form a core bundle defining interstices between the conductors, disposing filler compound in the said interstices to form a filled core, applying a core wrap to said filled core and applying an outer jacket to the resulting wrapped core, the improvement wherein the filler compound comprises a low density polyethylene constituent A and a low density polyethylene constituent B in proportions, based on the combined weights of said constituents, of from about 89 to about 95 percent of constituent A and correspondingly from about 5 to about 11 percent of constituent B, which constituent A has melt flow rate from about 25 to about 35 dg/min when measured by ASTM D–1238-70 at 50°C and 2,160 g total load using 0.0200 inch die orifice and which constituent B has melt flow rate from about 20 to about 50 dg/min when measured by ASTM D–1238-70 at 190°C and 2,160 g total load using 0.0825 inch die orifice, the melt blended mixture of said constituents A and B having a melt flow rate from about 1 to about 5 dg/min when measured by ASTM D–1238-70 at 50°C and 2,160 g total load using 0.0200 inch die orifice.

* * * * *